(12) United States Patent
Tsay et al.

(10) Patent No.: US 10,361,047 B1
(45) Date of Patent: Jul. 23, 2019

(54) PRESSURE SWITCH WITH CORRUGATED SHEETS

(71) Applicant: National Chung-Shan Institute of Science and Technology, Taoyuan (TW)

(72) Inventors: Kwei-Chi Tsay, Taoyuan (TW); Che-Pin Chen, Taoyuan (TW); Zong-Ham Wu, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 16/030,840

(22) Filed: Jul. 9, 2018

(30) Foreign Application Priority Data

Jan. 18, 2018 (TW) .............................. 107101845 A

(51) Int. Cl.
| | | |
|---|---|---|
| *H01H 35/30* | (2006.01) | |
| *H01H 35/38* | (2006.01) | |
| *H01H 35/24* | (2006.01) | |
| *H01H 35/32* | (2006.01) | |
| *G01F 1/36* | (2006.01) | |
| *H01H 35/34* | (2006.01) | |

(52) U.S. Cl.
CPC ............. *H01H 35/30* (2013.01); *G01F 1/363* (2013.01); *H01H 35/24* (2013.01); *H01H 35/245* (2013.01); *H01H 35/32* (2013.01); *H01H 35/34* (2013.01); *H01H 35/38* (2013.01); *H01H 2223/024* (2013.01)

(58) Field of Classification Search
CPC ....................................................... G01F 1/363
See application file for complete search history.

(56) References Cited

U.S. PATENT DOCUMENTS

| | | | | |
|---|---|---|---|---|
| 4,644,116 A * | 2/1987 | Miyakawa | ............. | H01H 35/34 200/83 J |
| 4,939,321 A * | 7/1990 | Tanaka | .................... | H01H 35/34 200/302.1 |
| 5,308,939 A * | 5/1994 | Sasaki | ................ | H01H 35/2685 200/302.1 |
| 8,446,241 B2 * | 5/2013 | Filiputti | ................. | H01H 39/00 335/185 |

* cited by examiner

*Primary Examiner* — Vanessa Girardi
(74) *Attorney, Agent, or Firm* — Winston Hsu

(57) ABSTRACT

The present application discloses a pressure switch which includes a tube structure, a pressure transmitting assembly, a microswitch, and corrugated sheets. The pressure transmitting assembly disposed inside the tube structure includes a guide rod with a piston, and a fluid chamber providing working pressure is defined between the piston and a fluid inlet. The microswitch is disposed at another end of the tube structure away from the fluid inlet and can be actuated by the guide rod. The corrugated sheets are fixed inside the tube structure and stacked on the piston structure so as to form a sealing and pressure transmitting interface for the pressure switch. Therefore, the pressure switch has good sealing property, good buffering capacity, and enhanced mechanical response rate with the corrugated sheets and is suitable for precision pressure measurement and control in an environment with high pressure and high frequency vibration.

10 Claims, 3 Drawing Sheets

PRESSURE SWITCH WITH CORRUGATED SHEETS

BACKGROUND OF THE INVENTION

1. Field of the Invention

The invention relates to a pressure switch, and more particularly, to a pressure switch with corrugated sheets.

2. Description of the Prior Art

A pressure switch is one of the sensors for sensing pressure. When a system pressure in a system exceeds a rated value, a pressure switch applied in the system can be switched to transmit an electrical signal that is immediately reported to the system for evaluation. Therefore, the pressure switch needs to have high reliability. In contrast to conventional pressure sensors, the pressure switch has advantages of simple design principles and lower cost, and thereby the pressure switch is commonly implemented in a gas or liquid pressure system so as to inform a corresponding controlling unit or an on-site staff about whether a working pressure in the pressure system meets basic operation requirements, which greatly facilitates system control procedure.

A conventional pressure transmitting component adopted in the pressure switch is usually in the form of a piston or a diaphragm. A piston pressure switch is generally adopted by industries. However, a common buffering component used in the piston pressure switch is usually a coil spring assembly, which has larger volume and heavier weight and therefore is not adequate for being applied in aerospace industries. Another kind of piston pressure switch adopts a leaf spring as the buffering component, which meets the requirements of high pressure endurance and volume reduction and is commonly used in military and aerospace industries. A diaphragm pressure switch is adequate for an environment with medium to low pressure and for the requirement of small volume, and therefore the diaphragm pressure switch is commonly used in aerospace and ordinary industries.

However, although the piston pressure switch has higher reliability and is adequate for being used in an environment with high pressure, a compressed O-ring on the piston might generate friction giving rise to larger pressure difference that causes a guide rod to press or separate from a microswitch at a mismatched time point, which leads to greater errors in pressure detection and control. The diaphragm pressure switch is more sensitive and adequate for an environment with smaller pressure difference but is not structurally strong enough to endure a high pressure. Therefore, for application in environments with harsher conditions such as in pressure measurement and control for a precision liquid or gas pressure braking system used in the field of aerospace, none of the aforementioned conventional pressure switches can meet both the requirements of precision and high pressure endurance simultaneously.

SUMMARY OF THE INVENTION

Therefore, an objective of the present invention is to provide a pressure switch with corrugated sheets to form a sealing and pressure transmitting interface for the pressure switch suitable for precision pressure measurement and control in an environment with high pressure and high frequency vibration, for solving aforementioned problems.

In order to achieve the aforementioned objective, the present invention discloses a pressure switch with corrugated sheets which includes a tube structure, a pressure transmitting assembly, a microswitch, and at least one corrugated sheet. A fluid inlet is formed at an end of the tube structure. The pressure transmitting assembly is disposed inside the tube structure and comprises a restraining body, a spring component and a guide rod. The restraining body is fixed on an inside of the tube structure. The guide rod passes through the restraining body and the spring component. The guide rod includes a piston structure disposed at an end of the guide rod facing towards the fluid inlet, and a diameter of the piston structure can be larger than a diameter of the guide rod. A fluid chamber is defined inside the tube structure and between the piston structure and the fluid inlet. A restraining portion is disposed in a middle of the guide rod and extends radially. The spring component is compressed between the restraining body and the restraining portion. The microswitch is disposed at another end of the tube structure away from the fluid inlet. The at least one corrugated sheet is fixed inside the tube structure and stacked at an end of the piston structure away from the fluid inlet. The at least one corrugated sheet sleeves the guide rod.

According to an embodiment of the present application, when a pressure in the fluid chamber achieves a rated pressure, the piston structure is pressurized by the pressure so as to push the guide rod to overcome resistance from the spring component and the at least one corrugated sheet so that the guide rod moves to press the microswitch for generating an actuating signal.

According to an embodiment of the present application, the at least one corrugated sheet is fixed inside the tube structure through a ring-shaped fixing plate fixed on the inside of the tube structure.

According to an embodiment of the present application, the pressure switch comprises a plurality of corrugated sheets combined into a composite corrugated sheet assembly by an electron beam welding method.

According to an embodiment of the present application, the at least one corrugated sheet is fixed on the inside of the tube structure by an electron beam welding method.

According to an embodiment of the present application, the microswitch comprises an outer screw structure for screwing the microswitch on the inside of the tube structure.

According to an embodiment of the present application, the pressure switch comprises a plurality of corrugated sheets, and a number of the plurality of the corrugated sheets is four.

According to an embodiment of the present application, the spring component is a coil spring.

According to an embodiment of the present application, the restraining body is a pre-stressing screw structure screwed on the inside of the tube structure.

According to an embodiment of the present application, the restraining portion is in a shape of a ring-shaped structure.

In summary, the present application provides a pressure switch which implements a plurality of superimposed corrugated sheets to form a sealing and pressure transmitting interface for the pressure switch suitable for precision pressure measurement and control in an environment with high pressure and high frequency vibration. In contrast to the conventional piston or diaphragm pressure switches, the pressure switch of the present application is made with good sealing property, good buffering capacity, and enhanced mechanical response rate. Therefore, the pressure switch of the present application has versatility in application and can be used in system liquid or gas pressure detection and control in aerospace industries, in manufacturing machines such as semiconductor equipment, in biomedical equipment, in liquid or gas transportation measurement and control in petrochemical industries, and in various other fields.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and claims, the system components are differentiated not by their names but by their function and structure differences. In the following discussion and claims, the terms "include" and "comprise" are used in an open-ended fashion and should be interpreted as "include but is not limited to". Also, the term "couple" or "link" is intended to mean either an indirect or a direct mechanical or electrical connection. Thus, if a first device is coupled or linked to a second device, that connection may be through a direct mechanical or electrical connection, or through an indirect mechanical or electrical connection via other devices and connections.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
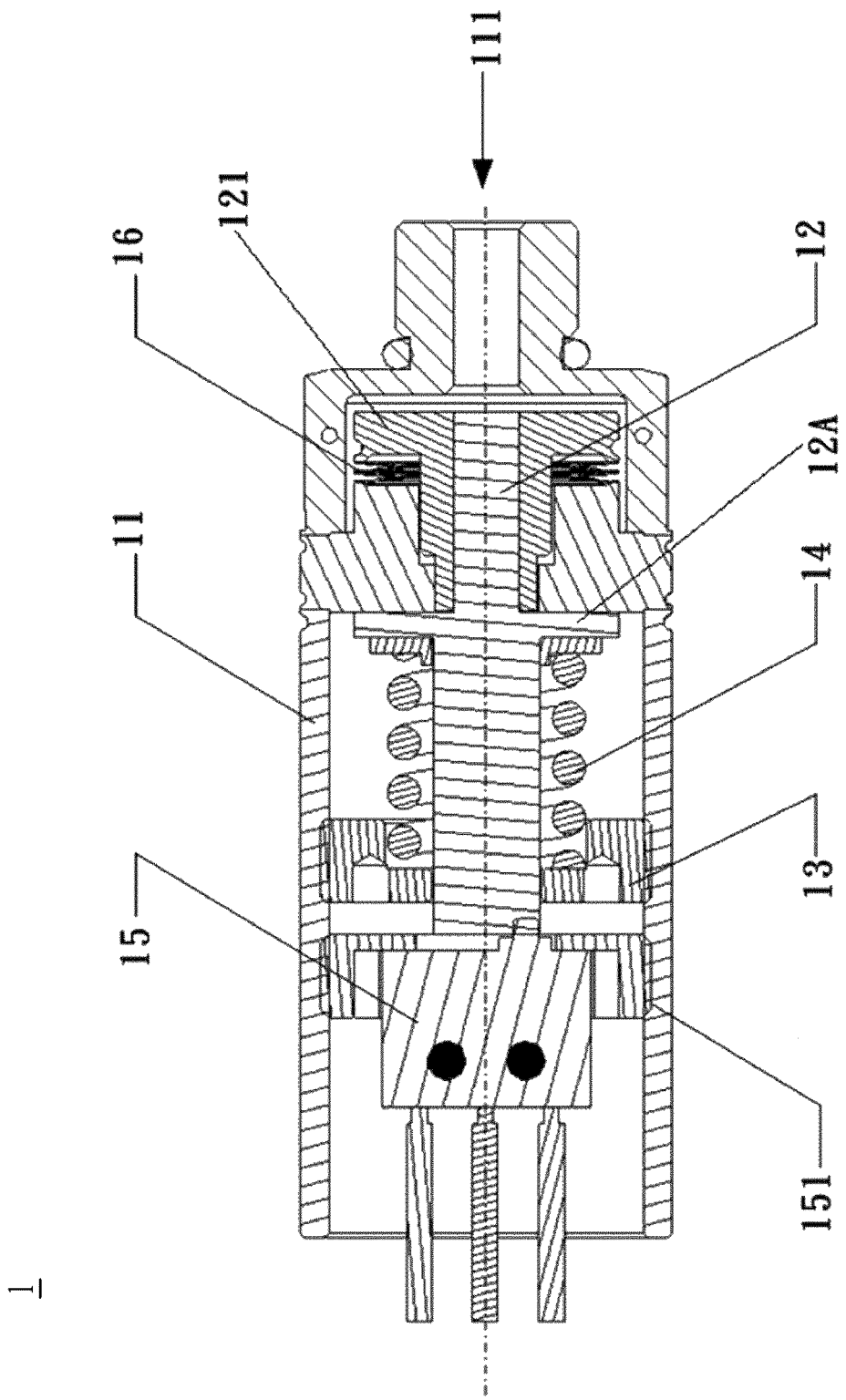
FIG. 1 is a diagram illustrating a structure of a pressure switch with corrugated sheets according to an embodiment of the present application.

Please refer to FIG. 1. FIG. 1 is a diagram illustrating a structure of a pressure switch 1 with corrugated sheets 16 according to an embodiment of the present application. The pressure switch 1 includes a tube structure 11 with a fluid inlet 111 being formed at an end of the tube structure 11, a guide rod 12, a restraining body 13, and a spring component 14. The guide rod 12 passes through the restraining body 13 and the spring component 14. A piston structure 121 is disposed at an end of the guide rod 12 facing towards the fluid inlet 111, and a diameter of the piston structure 121 can be larger than a diameter of portions of the guide rod 12 other than the piston structure 121. A fluid chamber is defined inside the tube structure 11 and between the piston structure 121 and the fluid inlet 111. A restraining portion 12A is disposed in a middle of the guide rod 12 and extends radially. The restraining body 13 can be, but is not limited to, a pre-stressing screw structure, and the pre-stressing screw structure is screwed and fixed on an inside wall of the tube structure 11. The spring component 14 is compressed between the restraining body 13 and the restraining portion 12A. A microswitch 15 is disposed at another end of the tube structure 11 away from the fluid inlet 111 and has an outer screw structure 151 for screwing the microswitch 15 on the inside of the tube structure 11. At least one corrugated sheet 16 is fixed on the inside of the tube structure 11 and stacked at an end of the piston structure 121 away from the fluid inlet 111. The corrugated sheet 16 sleeves the guide rod 12. It should be noticed that the restraining portion 12A in the middle of the guide rod 12 can be in, but is not limited to, a shape of a ring-shaped structure, and the spring component 14 can be, but is not limited to, a coil spring.

When a pressure in the fluid chamber achieves a rated pressure, the piston structure 121 can be pressurized by the pressure so as to push the guide rod 12 to overcome resistance from the spring component 14 and the corrugated sheet 16 so that the guide rod 12 moves to press the microswitch 15, which switches on an originally broken circuit of the microswitch 15 to generate an actuating signal which informs that the pressure in a system has reached the rated pressure.

Figure 2:
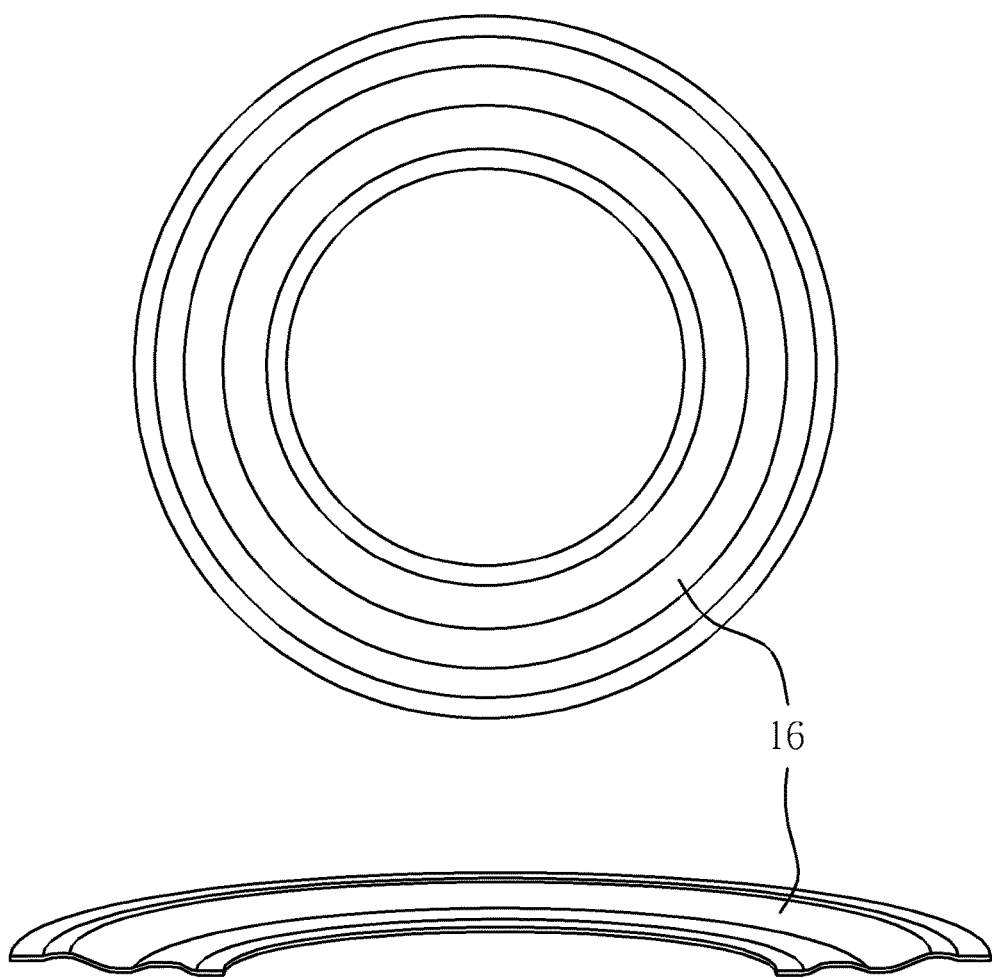
FIG. 2 is a diagram of the corrugated sheet according to the embodiment of the present application.

Please refer to FIG. 2. FIG. 2 is a diagram of the corrugated sheet 16 according to the embodiment of the present application. The compressed corrugated sheet 16 can deform axially to produce an axial deflection due to flexibility of the corrugated sheet 16. A total axial deflection being a sum of the respective axial deflections of superimposed parts of the corrugated sheets 16 can correspond to a displacement requirement of the pressure switch. In another embodiment of the present application, a plurality of superimposed corrugated sheets 16 can be combined into a composite corrugated sheet assembly via welding, but not limited to this. The welded composite corrugated sheet assembly is made with good sealing property and good buffering capacity, which not only solves the problems presented in the conventional piston or diaphragm pressure switches but also enhances mechanical response rate of the pressure switch.

Figure 3:
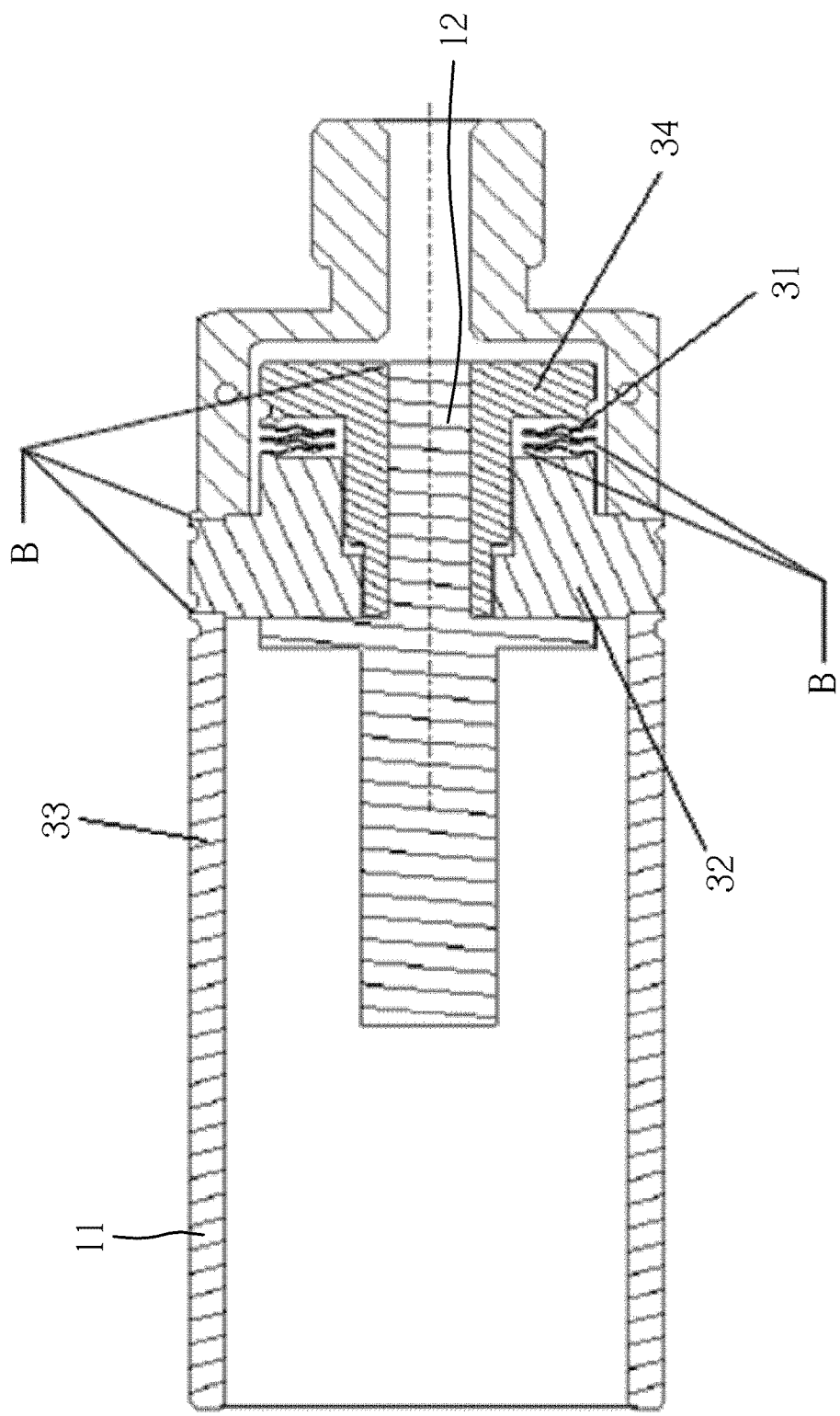
FIG. 3 is a diagram illustrating welding locations where the corrugated sheets and the tube structure are welded together according to the embodiment of the present application.

Please refer to FIG. 3. FIG. 3 is a diagram illustrating welding locations where the corrugated sheets and the tube structure 11 are welded together. The detailed welding procedure of welding the corrugated sheets and the tube structure 11 together is described as follows, but not limited to this. First, a plurality of corrugated sheets are axially superimposed and welded together at the inner and outer rims of the corrugated sheets to form a composite corrugated sheet assembly 31. Preferably, four corrugated sheets are welded, but not limited to this. In practical application, the corrugated sheets can be welded via, but not limited to, an electron beam welding method. After the composite corrugated sheet assembly 31 that can be correspondingly deformed to produce the required total axial deflection is formed by the welding, the composite corrugated sheet assembly 31 is welded to a ring-shaped fixing plate 32. As shown in FIG. 3, the integral of the welded composite corrugated sheet assembly 31 and the ring-shaped fixing plate 32 is welded to the tube structure 11 and the piston structure 34 of the guide rod 12 at locations of welding points B so as to form a sealing structure and a pressure transmitting interface. It should be noticed that in the aforementioned welding procedure, the plurality of corrugated sheets can be fixed on the inside of the tube structure 11 through the ring-shaped fixing plate 32 fixed on the inside of the tube structure 11, but not limited to this.

The composite corrugated sheet assembly 31 and the piston structure 34 of the guide rod 12 which are welded together form a path for transmitting force rendered from the pressure. The total axial deflection of the deformed composite corrugated sheet assembly 31 in the tube structure 11 corresponds to an end point where the displacement of the guide rod 12 terminates, and the end point corresponds to the deepest depth into the tube structure 11 where the microswitch 15 can be inserted and screwed lest the microswitch 15 should be overly pressed by the guide rod 12 during operation. By sheathing the guide rod 12 with the spring component 14, the spring component 14 is confined to axial deformation. The spring component 14 is further held and clamped between the restraining body 13 and the restraining portion 12A of the guide rod 12 lest the spring component 14 should radially shift due to vibration during operation. The microswitch 15 can be mounted to the tube structure 11 in the form of screw engagement for conveniently adjusting a distance between an actuating button of the microswitch 15 and the guide rod 12 so as to regulate the rated pressure that actuates the microswitch 15.

In summary, the present application provides a pressure switch which implements at least one superimposed corrugated sheet to form a sealing and pressure transmitting interface for the pressure switch suitable for precision pressure measurement and control in an environment with high pressure and high frequency vibration. In contrast to the conventional piston or diaphragm pressure switches, the pressure switch of the present application is made with good sealing property, good buffering capacity, and enhanced mechanical response rate. Therefore, the pressure switch of the present application has versatility in application and can be used in system liquid or gas pressure detection and control in aerospace industries, in manufacturing machines such as semiconductor equipment, in biomedical equipment, in liquid or gas transportation measurement and control in petrochemical industries, and in various other fields.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pressure switch with corrugated sheets, comprising:
a tube structure, a fluid inlet being formed at an end of the tube structure;
a pressure transmitting assembly disposed inside the tube structure and comprising a restraining body, a spring component, and a guide rod, the restraining body being fixed on an inside of the tube structure, the guide rod passing through the restraining body and the spring component, and the guide rod comprising:
a piston structure disposed at an end of the guide rod facing towards the fluid inlet, a fluid chamber being defined inside the tube structure and between the piston structure and the fluid inlet; and
a restraining portion disposed in a middle of the guide rod and extending radially, and the spring component being compressed between the restraining body and the restraining portion;
a microswitch disposed at another end of the tube structure away from the fluid inlet; and
at least one corrugated sheet fixed inside the tube structure and stacked at an end of the piston structure away from the fluid inlet and sleeving the guide rod.

2. The pressure switch of claim 1, wherein when a pressure in the fluid chamber achieves a rated pressure, the piston structure is pressurized by the pressure so as to push the guide rod to overcome resistance from the spring component and the at least one corrugated sheet so that the guide rod moves to press the microswitch for generating an actuating signal.

3. The pressure switch of claim 1, wherein the at least one corrugated sheet is fixed inside the tube structure through a ring-shaped fixing plate fixed on the inside of the tube structure.

4. The pressure switch of claim 1, wherein the at least one corrugated sheet is fixed on the inside of the tube structure by an electron beam welding method.

5. The pressure switch of claim 1, wherein the pressure switch comprises a plurality of corrugated sheets combined into a composite corrugated sheet assembly by an electron beam welding method.

6. The pressure switch of claim 1, wherein the microswitch comprises an outer screw structure for screwing the microswitch on the inside of the tube structure.

7. The pressure switch of claim 1, wherein the pressure switch comprises a plurality of corrugated sheets, and a number of the plurality of the corrugated sheets is four.

8. The pressure switch of claim 1, wherein the spring component is a coil spring.

9. The pressure switch of claim 1, wherein the restraining body is a pre-stressing screw structure screwed on the inside of the tube structure.

10. The pressure switch of claim 1, wherein the restraining portion is in a shape of a ring-shaped structure.

* * * * *